United States Patent [19]

Domeki et al.

[11] Patent Number: 4,782,316
[45] Date of Patent: Nov. 1, 1988

[54] CORE WINDING WITH INORGANIC INSULATION BETWEEN THE INNER CONDUCTOR AND OUTER METAL SHEATH

[75] Inventors: Yokichi Domeki; Masanori Nozaki, both of Hitachi; Hajime Ishimaru, Ibaraki; Masao Tezuka, Hitachi, all of Japan

[73] Assignee: Sukegawa Electric Co., Ltd., Hitachi, Japan

[21] Appl. No.: 931,371

[22] Filed: Nov. 14, 1986

[30] Foreign Application Priority Data

Nov. 29, 1985 [JP] Japan .................. 60-270071
Feb. 12, 1986 [JP] Japan .................. 61-18513

[51] Int. Cl.$^4$ .............................................. H01F 5/00
[52] U.S. Cl. ............................ 335/299; 310/180; 174/102 P
[58] Field of Search ............... 335/299; 174/102 P, 174/118; 336/195; 310/180

[56] References Cited

U.S. PATENT DOCUMENTS

| | | | |
|---|---|---|---|
| 4,345,111 | 8/1982 | Petitcolas | 174/102 P |
| 4,415,674 | 11/1983 | Johnson | 174/102 P |
| 4,439,255 | 3/1984 | Imai et al. | 174/102 P |

FOREIGN PATENT DOCUMENTS

| | | | |
|---|---|---|---|
| 1562741 | 10/1982 | France | 335/296 |
| 369181 | 8/1982 | United Kingdom | 335/296 |
| 1225368 | 5/1983 | United Kingdom | 335/296 |
| 914041 | 11/1983 | United Kingdom | 335/296 |
| 688185 | 3/1984 | United Kingdom | 335/296 |

*Primary Examiner*—George Harris
*Attorney, Agent, or Firm*—Flynn, Thiel, Boutell & Tanis

[57] ABSTRACT

Electromagnetic parts have windings composed of an inorganic insulating cable including a metal sheath, an inorganic insulating material, and conductive wires. Thereby, the windings are adapted to have higher heat resisting properties by selectively employing a material having a higher melting point and not changing its state even at temperature of about several hundred degrees Celsius as the sheath and the conductive wire.

12 Claims, 3 Drawing Sheets

CORE WINDING WITH INORGANIC INSULATION BETWEEN THE INNER CONDUCTOR AND OUTER METAL SHEATH

BACKGROUND OF THE INVENTION

1. Field of the Invention

The present invention relates to electromagnetic parts for use in electrical equipment by making use of electromagnetic action.

2. Description of the Prior Art

Electromagnetic parts for use in electrical equipment such as motors, generators, and transformers are formed by winding a winding around a magnetic core.

For instance, shown in FIGS. 8 to 10 is a stator of a motor as an example of such electromagnetic parts. The core 1 in this case employs a laminated core formed by cylindrically laminating a thin silicon steel sheet. In addition, the core 1 has slots 3, 3 . . . longitudinally thereof for housing windings 2, 2 . . . which are wound to surround magnetic poles 4, 4 . . . formed among the slots 3, 3 . . . .

Prior electromagnetic parts employ the so called enamel wire as the wirings 2, 2 . . . , the enamel wire being yielded by coating a surface of a copper wire with a coating of insulating resin. For the enamel wire, one having PVF called Formal wire or Formex wire baked thereon is widely employed, and in particular when electromagnetic parts are employed at higher temperature, a heat resisting enamel wire on which epoxy resin and silicon resin or polyimide resin, etc. baked thereon is employed.

Such an enamel wire is, since likely to be damaged, enclosed with an insulating cover 5 or an insulating sheet 6 substantially made of resin and mica, etc., and housed in the slots 3, 3 . . . . These windings 2, 2 . . . are connected to each other as needed in the electromagnetic parts, from which lead wires 7, 7 . . . are taken out for connection with a power source (not shown). As the lead wires 7, 7 . . . , a resin coated wire is typically employed. Nowadays, various vacuum appratus are widely employed in various fields such as for example, energy and medical treatment, etc., as well as in industry. To drive and control, or measure any equipment in such a vacuum apparatus, the need to employ an electical equipment such as motors, linear actuators, and generators has been increased.

However, in evacuating gases from such a vacuum apparatus to a vacuum, particularly to a high vacuum more than $10^{-3}$ Torr or a ultra-high vacuum more than $10^{-7}$ Torr, gas molecules such as air absorbed in a substance are released into the vacuum. This causes some troubles in that foreign molecules are mixed in the vacuum. Accordingly, for electrical equipment to be employed in a vacuum, they must be subjected to heat treatment called baking where they are previously exposed to temperature from 350° to 400° C. for evaporating adsorbed gases.

However, prior electromagnetic parts which use an enamel wire as the windings 2, 2 . . . are applicable only at temperature of 300° C. or less even if a heat resisting one is employed therefor. Accordingly, the baking can not be applied thereto.

Moreover, heat radiation due to convention in the atmosphere can substantially not be anticipated in a vacuum, so that, when employing any electical equipment therein, electromagnetic parts included therein reaches high temperature of several hundred degrees Celsius owing to heat dissipation from the electric resistance of the windings 2, 2 . . . and eddy-current loss, etc. produced in the core 1. Under such a situation, baked resins and the like, which are difficult to be evaporated in the atmosphere, are also evaporated and released in the vacuum vessel as molecules thereof.

Accordingly, it is actually impossible to employ in a vacuum prior electromagnetic parts using an enamel wire as the windings 2, 2 . . . .

As a result, a prior vacuum apparatus was adapted to remotely incorporate needed power externally of the vacuum vessel via a link such as a shaft and an arm, etc.

SUMARY OF THE INVENTION

In view of the drawbacks of the prior electromagnetic parts, it is an object of the present invention to provide electromagnetic parts, capable of resisting temperatures of several hundred degrees Celsius or more and having a surface thereof formed only with metal or an oxide thereof, for permitting electric equipment to be employed in a vacuum.

To achieve the above objects, electromagnetic parts for electrical equipment have windings 12, 12 . . . constructed by an inorganic insulating cable 13 covering conductive wires 14, 14 . . . with a metal sheath 15 and are adapted to have an inorganic insulating material 16 between the conductive wires 14, 14 . . . and the metal sheath 15.

In addition, for the inorganic insulating cable 13, a single core type only with a single conductive wire 14 housed in the sheath 15 or a multicore type with a plurality of conductive wires may be employed.

According to the present invention, as described above, the electromagnetic parts comprise the wirings 12, 12 . . . composed of the inorganic insulating cable 13 including the metal sheath 15, the inorganic insulating material 16, and the conductive wire 14. Accordingly, provided any material having a higher melting point and not changing in its state even at temperature of about several hundred degrees Celsius is employed, the wirings 12, 12 . . . can exert higher heat resistance.

Furthermore, since the sheath 15 is strong against the friction between it and the core 11 in comparison with a baked insulating resin coating, it is capable of being directly wound around the core 11 without using an insulating cover. Therefore, a surface of the electromagnetic parts can be constructed only with metal or an oxide thereof, namely with the core 11 and with the sheath 15.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
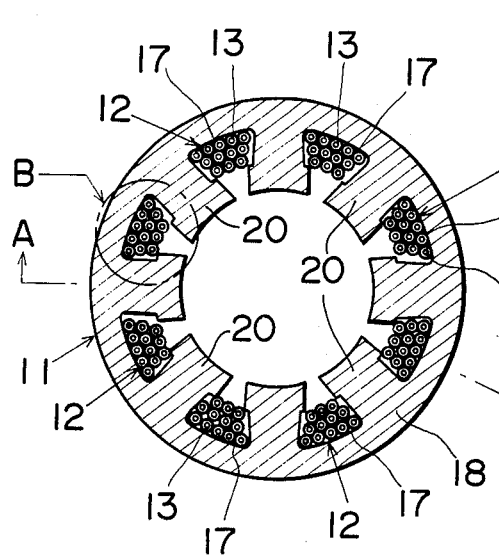
FIG. 1 is a transverse plan view illustrating an embodiment of electronic parts according to the presentt invention.
Figure 3:
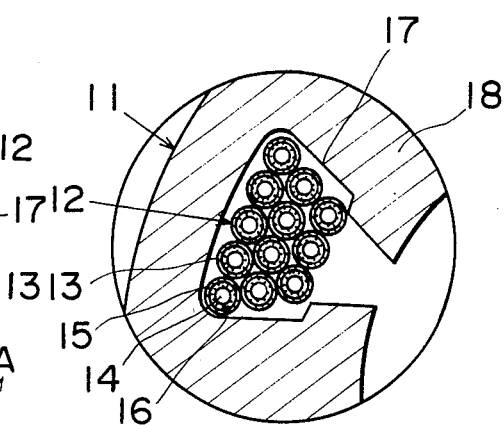
FIG. 3 is an enlarged view of a B portion of the embodiment of FIG. 1.

Let us here describe embodiments of electromagnetic parts according to the present invention with reference to FIGS. 1 to 7.

First, a first embodiment shown in FIGS. 1 to 4 is addapted to be applied to a stator for a motor. To be specific, a laminated core 11 is formed by cylindrically laminating magnetic sheets 18, 18 comprising silicon steel sheet, etc., and slots 17, 17 are provided in the internal peripheral surface of the core 11 longitudinally therein for housing windings 12, 12 . . . . The windings 12, 12 . . . are each wound and housed so as to surround any one of magnetic poles 20, 20 . . . formed between adjoining ones among the slots 17, 17. Moreover, lead wires 19, 19 . . . are taken out from these wirings 12, 12 . . . for connection with a power source.

Figure 2:
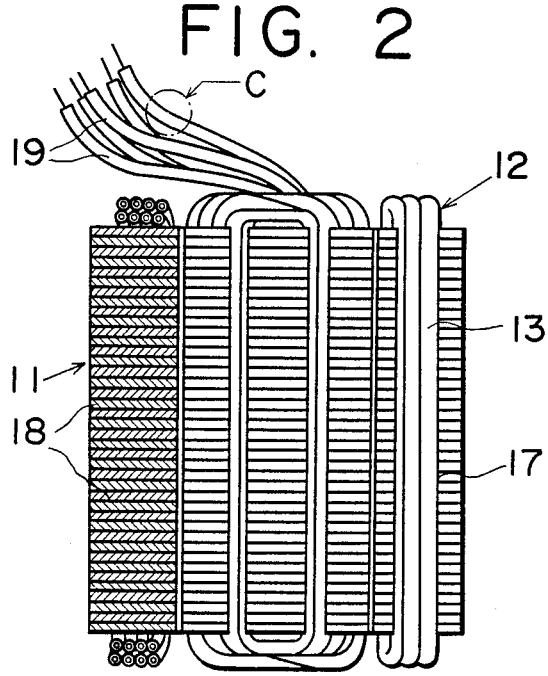
FIG. 2 is a cross sectional view of the embodiment of FIG. 1 along a line A—A of FIG. 1.
Figure 4:
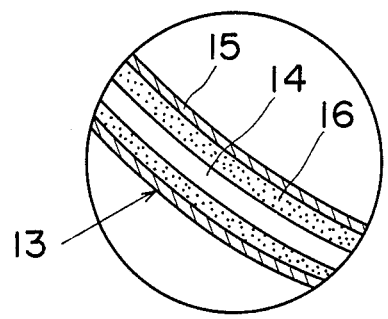
FIG. 4 is an enlarged view of a C portion of FIG. 2.

As described previously, for the windings 12, 12 . . . , an inorganic insulating cable 13 with use of a metal sheath 15 is employed. For instance, for the inorganic insulating cable 13 shown in FIG. 4, a single core type is employed, which is yielded by arranging the conductive wire 14 at the center of the cable, covering the periphery of the core with the metal sheath 15, and filling a space between the conductive wire 14 and the sheath 15 with an inorganic insulating material 16. In addition, these inorganic insulating cables 13 may be wound around the core 11 by twisting a plurality of them without winding them in parallel to the core 11, as shown in FIG. 2.

For the conductive wire 14, those made of copper and nickel, etc., are properly employed, which can bear environmental temperature of several hundred degrees Celsius and have lower electrical resistances. In addition, for the inorganic insulating material 16, powders of MgO, BN, and $Al_2O_3$, etc., are commonly employed.

For the sheath 15, those materials are desired which can endure temperature of several hundred degrees Celsius and are made of non-magnetic metal to prevent magnetic loss or mechanical vibration from being produced as much as possible. Moreover, in order to reduce electrical resistances produced among the laminated magnetic sheets 18, 18 . . . as low as possible, a metal oxide coating having higher electric resistance is applied on the surfaces of the magnetic sheets 18, 18 . . . and the sheath 15, while those having relatively higher electric resistance may be advantageously employed also for the sheath 15.

As a material for the sheath 15 having such conditions, stainless steel and Inconel, etc., are suitably employed.

An inorganic insulating cable equipped with such a sheath 15 is thick as a whole in its outer diameter rather than a cross sectional area of the conductor as compared with an enamel wire conventionally employed as a winding. However, it can overcome such a demerit of being thick in its outer diameter from the reasons that it can be wound directly on the core 11 without employing an insulating cover and an insulating sheet, etc., and that it can apply a higher current therethrough per unit cross sectional area of the conductor thereof since it has higher heat resistance and insulating properties.

The inorganic insulating cable 13 makes it relativly difficult to permit the sheath 15 to be sealed at a joint portion of the cable 13 when the sheath 15 is peeled off and the cable 13 is connected with another partner of the cable 13 desired to be connected. Accordingly, it is proper to connect lead wires 19, 19 . . . outside the electromagnetic parts by drawing out as extensions the lead wires 19, 19 . . . from the windings 12, 12 . . . for each of the windings without connecting the windings 12, 12 . . . in the electromagnetic parts. In particular, in connecting the wirings in the electromagnetic parts, it is necessary to securely seal an end portion of the sheath 15.

For the magnetic sheets 18, 18 . . . constituting the core 11, these having a Curie point as high as possible should be selectively employed, but a Curie point of a silicon steel sheet employed typically ranges from 690° to 770° C. and thus it offers no trouble on its practical use.

Figure 5:
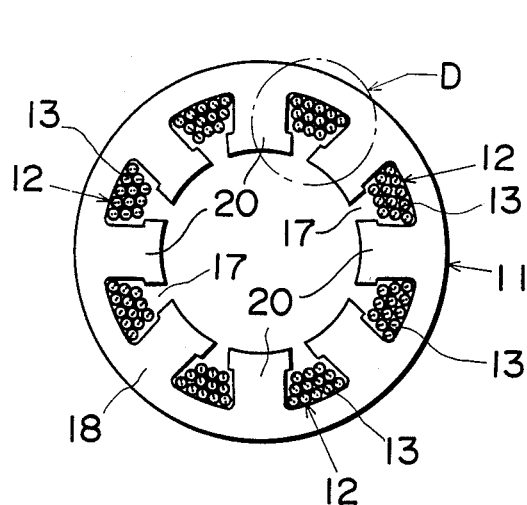
FIG. 5 is a transverse plan view illustrating another embodiment of electromagnetic parts according to the present invention.
Figure 6:
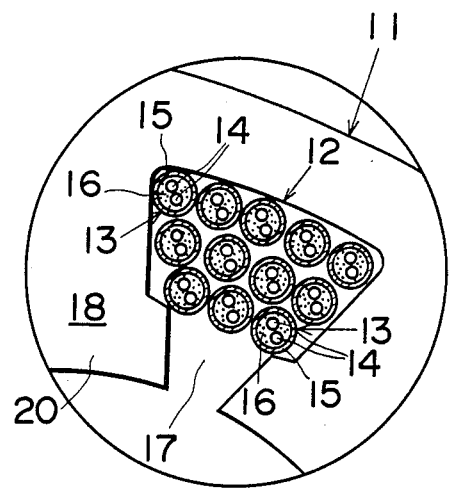
FIG. 6 is an enlarged view of a D portion of FIG. 5.
Figure 7:
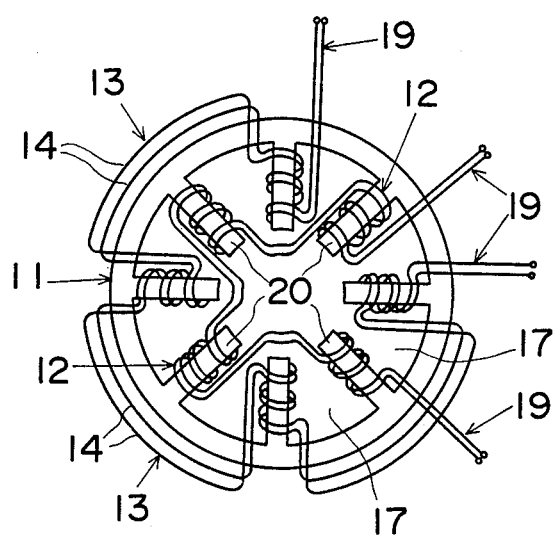
FIG. 7 is a view of windings of the same electromagnetic parts.
Figure 8:
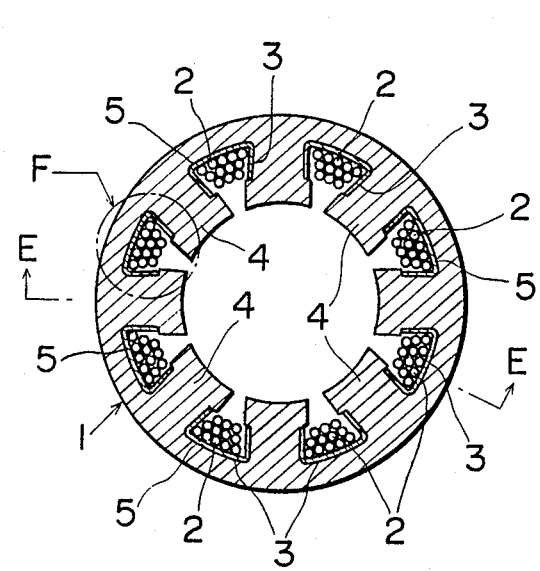
FIG. 8 is a transverse plan view illustrating a prior example of electromagnetic parts.
Figure 10:
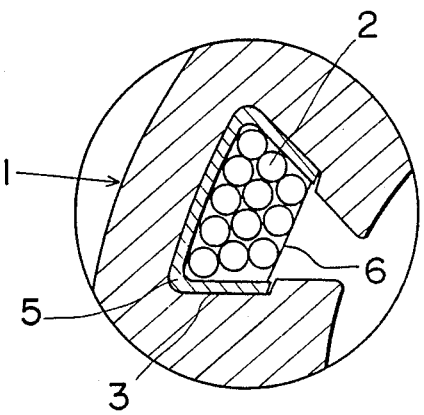
FIG. 10 is an enlarged view of a portion F of FIG. 8.
Figure 9:
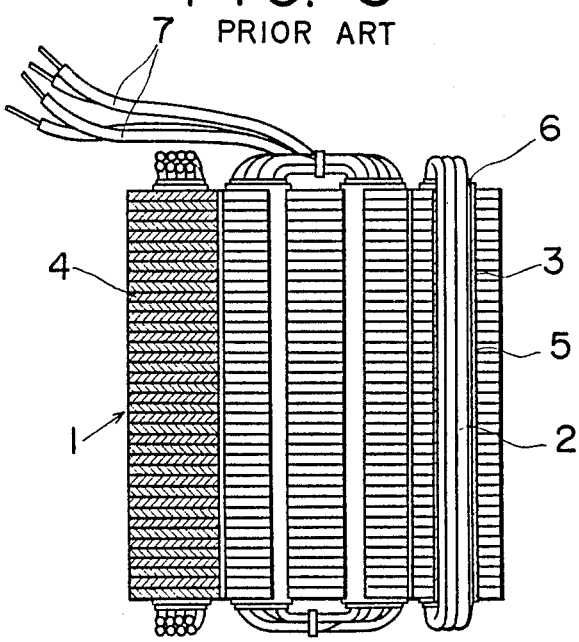
FIG. 9 is a cross sectional view of FIG. 8 along a line E—E.

A second embodiment shown in FIGS. 5 to 7 employs a double core conductor inorganic insulating cable 13 as the windings 12, 12 . . . , and constitutes a stator of a four-phase motor. As evidenced from the view of FIG. 7 showing an arrangement of the winding, the same number of turns of the double core conductor cable as that yielded by doubly winding a single core conductor inorganic insulating cable 13 can be assured by singly winding the double conductor inorganic insulating cable 13 around each of the magnetic poles 20, 20.

In this case, the double core conductor inorganic insulating cable 13 is thick on the whole as compared with the single core conductor inorganic insulating cable 13 of FIGS. 1-4. However, it can sufficiently be reduced in its diameter rather than in the use of two of the single core conductor inorganic insulating cables 13'. Accordingly, a volume occupied by the windings 12, 12 . . . can be in general reduced to assure the same number of turns.

Furthermore, although terminals of the conductive wires 14, 14 . . . being drawn out, in case of the four-phase motor, are 8 in total, those of the inorganic insulating cable 13 being drawn out, in case of the use of the double core conductor inorganic insulating cable 13, are appearingly four. Accordingly, the number of the lead wires 19, 19 . . . can substantially be reduced.

These aspects may also be applied to any cable with use of three core conductors or more as the multicore conductor inorganic insulating cable 13. Furthermore, upon employing such multicore conductor inorganic insulating cable 13, the conductive wires 14, 14 . . . may be housed in the sheath 15 after twisting them.

Moreover, although the above embodiments were applied to the stator of the motor, it may also be applied to any other electromagnetic parts yielded by winding the windings 12, 12 . . . on the core 11 such for example as stators and rotors of generators, or transformers irrespective of their applications.

According to the present invention, as described above, the electromagnetic parts can be employed and treated under a higher temperature condition since they are adapted to be highly resistant to heat, and can be baked to enable their use in a vacuum, while they can be employed in a vacuum without causing any heat radiation phonomenon probably caused by any convection. In addition, since the present electromagnetic parts form its surface only with metal or an oxide thereof, it melts only at higher temperature of about several hundred degrees Celsius, thus without producing any matter likely to be evaporated in a vacuum.

Thus, the present invention can provide electromagnetic parts usable in a vacuum where the use of prior electromagnetic parts were believed to be difficult, and thus can achieve its contrived object.

Although certain preferred embodiments have been shown and described, it should be understood that many changes and modifications may be made therein without departing from the scope of the appended claims.

What is claimed is:

1. An electromagnetic part for use in electrical equipment comprising:
   (a) a core and
   (b) windings wound around said core, said windings being made with an inorganic insulating cable comprising conductive wires, a metal sheath surrounding said conductive wires and an inorganic insulating material provided between said conductive wires and said metal sheath.

2. The electromagnetic part according to claim 1, wherein said inorganic insulating cable is a multicore inorganic insulating cable having a plurality of said conductive wires housed in said sheath.

3. The electromagnetic part according to claim 1, wherein said sheath is made of a non-magnetic metal substance.

4. The electromagnetic part according to claim 1, wherein said conductive wires are made of a metal selected from the group consisting of copper and nickel.

5. The electromagnetic part according to claim 1, wherein said inorganic insulating material is selected from the group consisting of powders of MgO, BN and $Al_2O_3$.

6. The electromagnetic part according to claim 1, wherein said metal sheath is made of a metal selected from the group consisting of stainless steel and inconel.

7. In a stator comprising a laminated core having a plurality of circumferentially spaced magnetic poles surrounded by windings, the improvement comprising said windings being made with an inorganic insulating cable comprising conductive wires, a metal sheath surrounding said conductive wires and an inorganic insulating material provided between said conductive wires and said metal sheath.

8. The stator according to claim 7, wherein said inorganic insulating cable is a multicore inorganic insulating cable having a plurality of said conductive wires housed in said sheath.

9. The stator according to claim 7, wherein said sheath is made of a non-magnetic metal substance.

10. The stator according to claim 7, wherein said conductive wires are made of a metal selected from the group consisting of copper and nickel.

11. The stator according to claim 7, wherein said inorganic insulating material is selected from the group consisting of powders of MgO, BN and $Al_2O_3$.

12. The stator according to claim 7, wherein said metal sheath is made of a metal selected from the group consisting of stainless steel and inconel.

* * * * *